US012464310B2

(12) United States Patent
Lee et al.

(10) Patent No.: US 12,464,310 B2
(45) Date of Patent: Nov. 4, 2025

(54) AUDIO SIGNAL PROCESSING APPARATUS AND AUDIO SIGNAL PROCESSING METHOD

(71) Applicant: Electronics and Telecommunications Research Institute, Daejeon (KR)

(72) Inventors: Yong Ju Lee, Daejeon (KR); Jae-hyoun Yoo, Daejeon (KR); Dae Young Jang, Daejeon (KR); Kyeongok Kang, Daejeon (KR); Tae Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 308 days.

(21) Appl. No.: 18/191,695

(22) Filed: Mar. 28, 2023

(65) Prior Publication Data

US 2023/0308828 A1 Sep. 28, 2023

(30) Foreign Application Priority Data

Mar. 28, 2022 (KR) ........................ 10-2022-0038009
Feb. 13, 2023 (KR) ........................ 10-2023-0018816

(51) Int. Cl.
*H04S 7/00* (2006.01)

(52) U.S. Cl.
CPC .............. *H04S 7/305* (2013.01); *H04S 7/303* (2013.01); *H04S 2400/11* (2013.01)

(58) Field of Classification Search
None
See application file for complete search history.

(56) References Cited

U.S. PATENT DOCUMENTS

| | | | | |
|---|---|---|---|---|
| 11,032,662 | B2 | 6/2021 | Sarkar | |
| 11,070,933 | B1 | 7/2021 | Schroeder et al. | |
| 11,082,796 | B2 | 8/2021 | Mindlin et al. | |
| 2012/0269355 | A1* | 10/2012 | Chandak | H04S 7/30 381/56 |

(Continued)

FOREIGN PATENT DOCUMENTS

| | | | |
|---|---|---|---|
| WO | 2021/180940 | 9/2021 | |
| WO | WO-2023169934 A1 * | 9/2023 | G10L 19/008 |

OTHER PUBLICATIONS

Samarasinghe et al. (2018). Spherical Harmonics Based Generalized Image Source Method for Simulating Room Acoustics. J. Acoust. Soc. Am., 144(3), 1-36.

(Continued)

*Primary Examiner* — Qin Zhu
(74) *Attorney, Agent, or Firm* — KILE PARK REED & HOUTTEMAN PLLC

(57) ABSTRACT

An audio signal processing apparatus and an audio signal processing method are disclosed. The audio signal processing method performed by the audio signal processing apparatus includes determining whether a line of sight between a render item (RI) corresponding to an audio element and a listener is visible, based on a bitstream, in response to a case where the line of sight is invisible, generating an audio signal by rendering a diffraction-type RI corresponding to the RI, and outputting the audio signal.

17 Claims, 14 Drawing Sheets

(56) References Cited

U.S. PATENT DOCUMENTS

| | | | | |
|---|---|---|---|---|
| 2019/0356999 | A1* | 11/2019 | Raghuvanshi .......... | H04S 7/304 |
| 2020/0296533 | A1* | 9/2020 | Thall ....................... | H04S 7/305 |

OTHER PUBLICATIONS

Albuquerque et al., "Indoor Acoustic Simulator : A Modeling and Simulation Framework with Doppler Effect for Broadband Ultrasonic Applications", Lap Lambert Academic Publishing, Feb. 8, 2017, 128 total pages.
Pascoe, D. (Mar. 21, 2023). Wave Behaviour 1. Rogue Physicist. https://roguephysicist.com/wave_behaviour.htm.
Pohl et al., "Comparison of edge diraction simulation methods", Jan. 2011, 3 total pages.
ISO/IEC JTC1/SC29/WG11/N18518, "MPEG-I Audio Architecture and Requirements", Jan. 2019, pp. 1-6.
Diffraction. (Mar. 21, 2023). In Wikipedia. https://en.wikipedia.org/wiki/Diffraction.

* cited by examiner

AUDIO SIGNAL PROCESSING APPARATUS AND AUDIO SIGNAL PROCESSING METHOD

CROSS-REFERENCE TO RELATED APPLICATION

This application claims the benefit of Korean Patent Application No. 10-2022-0038009 filed on Mar. 28, 2022, and Korean Patent Application No. 10-2023-0018816 filed on Feb. 13, 2023, in the Korean Intellectual Property Office, the entire disclosures of which are incorporated herein by reference for all purposes.

BACKGROUND

1. Field of the Invention

One or more embodiments relate to an audio signal processing apparatus and an audio signal processing method performed by the audio signal processing apparatus.

2. Description of the Related Art

Audio services have been changed from mono and stereo services to multi-channel services such as 9.1, 11.1, 10.2, 13.1, 15.1, and 22.2 channels including uplink channels through 5.1 and 7.1 channels.

Meanwhile, an object-based audio service technology is also being developed. The object-based audio service technology is a technology for considering one sound source as an object, unlike the existing channel services, and storing, transmitting, and reproducing an object audio signal and object audio-related information, such as a position, level, etc. of an object audio.

The above description has been possessed or acquired by the inventor(s) in the course of conceiving the present disclosure and is not necessarily an art publicly known before the present application is filed.

SUMMARY

Embodiments provide an audio signal processing apparatus capable of effectively reducing the amount of computation of a terminal in rendering an object audio for reproducing a spatial audio, and an audio signal processing method performed by the audio signal processing apparatus.

However, the technical aspects are not limited to the aforementioned aspects, and other technical aspects may be present.

According to an aspect, there is provided an audio signal processing method performed by an audio signal processing apparatus, the method including determining whether a line of sight between a render item (RI) corresponding to an audio element and a listener is visible, based on a bitstream, in response to a case where the line of sight is invisible, generating an audio signal by rendering a diffraction-type RI corresponding to the RI, and outputting the audio signal.

The generating may include performing a diffraction path finding process from the RI to the listener to find a diffraction path and creating the diffraction-type RI based on the diffraction path.

The diffraction path finding process may be performed by using geometrical data from the bitstream.

The geometrical data may be included in metadata in the bitstream.

The determining may include determining whether the line of sight is visible by using line-of-sight occlusion information based on the bitstream.

The method may further include, in response to a case where the line of sight is visible, generating an audio signal by rendering the RI without creating the diffraction-type RI.

The determining may include determining whether the line of sight is visible based on whether a direct sound of the RI is directly delivered to the listener.

The determining may include determining whether the line of sight is visible based on whether an occlusion exists in a shortest path between the RI and the listener.

The determining may include determining whether the line of sight is visible based on whether an impulse response between the RI and the listener includes a response of a shortest path between the RI and the listener.

According to another aspect, there is provided an audio signal processing method performed by an audio signal processing apparatus, the method including determining whether a line of sight between a RI corresponding to an audio element and a listener is visible based on a bitstream, in response to a case where the line of sight is invisible, performing a diffraction path finding process from the RI to the listener to find a diffraction path, and creating a diffraction-type RI based on the diffraction path.

A non-transitory computer-readable storage medium may store instructions that, when executed by a processor, cause the processor to perform the audio signal processing method.

According to still another aspect, there is provided an audio signal processing apparatus including a processor, and a memory configured to store at least one instruction executable by the processor. When the at least one instruction is executed by the processor, the processor may be configured to determine whether a line of sight between a RI corresponding to an audio element and a listener is visible based on a bitstream, in response to a case where the line of sight is invisible, generate an audio signal by rendering a diffraction-type RI corresponding to the RI, and output the audio signal.

The processor may be configured to perform a diffraction path finding process from the RI to the listener to find a diffraction path and create the diffraction-type RI based on the diffraction path.

The diffraction path finding process may be performed by using geometrical data from the bitstream.

The geometrical data may be included in metadata in the bitstream.

The processor may be configured to determine whether the line of sight is visible by using line-of-sight occlusion information based on the bitstream.

The processor may be configured to, in response to a case where the line of sight is visible, generate an audio signal by rendering the RI without creating the diffraction-type RI.

The processor may be configured to determine whether the line of sight is visible based on whether a direct sound of the RI is directly delivered to the listener.

The processor may be configured to determine whether the line of sight is visible based on whether an occlusion exists in a shortest path between the RI and the listener.

The processor may be configured to determine whether the line of sight is visible based on whether an impulse response between the RI and the listener includes a response of a shortest path between the RI and the listener.

Additional aspects of embodiments will be set forth in part in the description which follows and, in part, will be apparent from the description, or may be learned by practice of the disclosure.

According to embodiments, the audio signal processing apparatus and the audio signal processing method may reduce the amount of computation with substantially no effect on a rendering effect of an object audio through a method of not performing a diffraction process, when a rendering effect by diffraction is low when processing a diffraction effect.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
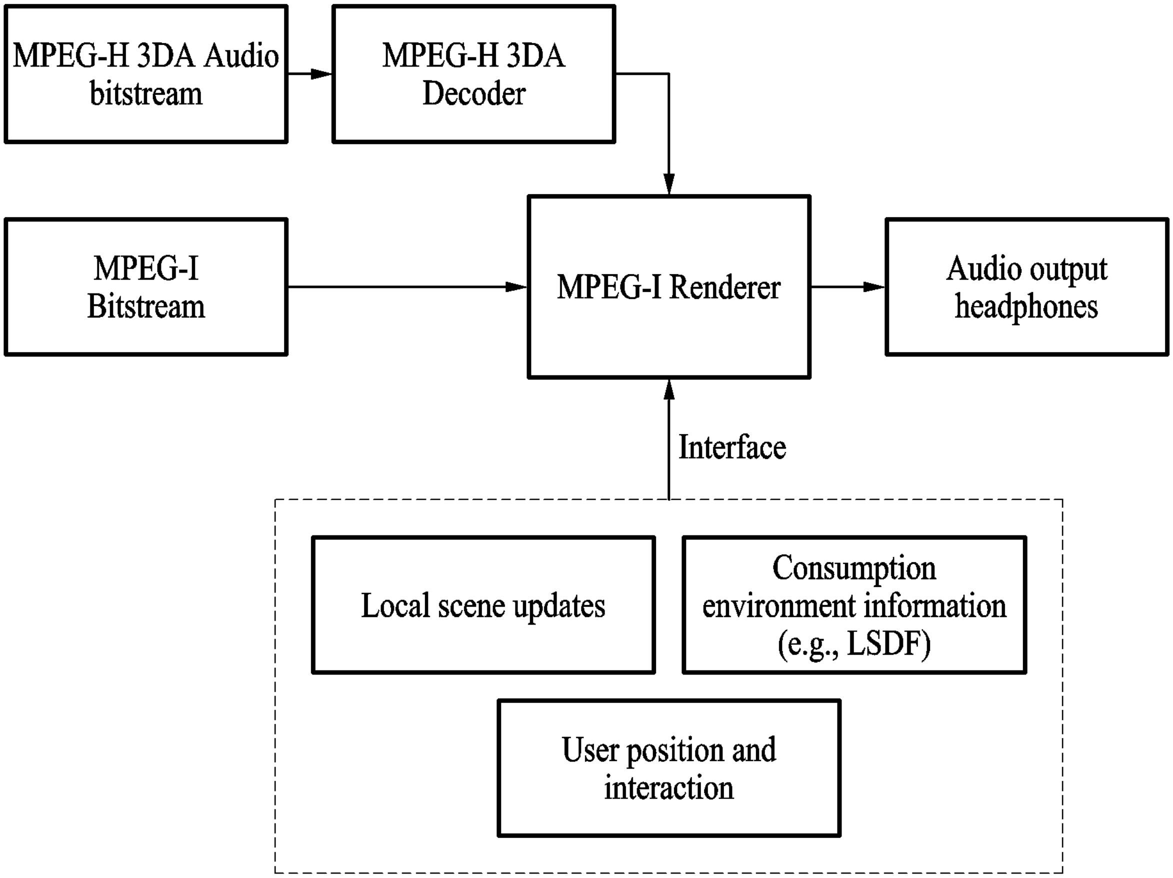
FIG. 1 is a diagram illustrating a rendering architecture according to an embodiment.

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the embodiments will be described in detail with reference to the accompanying drawings. When describing an embodiment with reference to the accompanying drawings, like reference numerals refer to like elements and a repeated description related thereto will be omitted.

FIG. 1 is a diagram illustrating a rendering architecture according to an embodiment.

In an example, a renderer (e.g., MPEG-I Renderer of FIG. 1) may operate at a global sampling frequency of 48 kilohertz (kHz). Input pulse-code modulation (PCM) audio data using a different sampling frequency may be resampled to 48 kHz before processing.

FIG. 1 shows an example of connection between the renderer and a MPEG-H 3DA coded audio element bitstream, a metadata MPEG-I bitstream, and an external device such as an interface.

For example, the MPEG-H 3DA coded audio element (e.g., MPEG-H 3DA audio bitstream) may be decoded by a MPEG-H 3DA decoder. The decoded audio may be rendered together with the MPEG-I bitstream. The MPEG-I bitstream may transmit, to the renderer, an audio scene description and other metadata used in the renderer. In addition, an interface accessible to consumption environment information, scene updates during playback, user interaction and user position information may be input to the renderer.

The renderer may provide real-time auralization of a six degrees of freedom (6DoF) audio scene in which a user may directly interact with entities in the scene. For the real-time auralization of the 6DoF audio scene, a multithreaded software architecture may be divided into several workflows and components. A block diagram including a renderer component may be shown in FIG. 2. The renderer may support rendering of virtual reality (VR) and augmented reality (AR) scenes. The renderer may obtain rendering metadata and audio scene information for the VR and AR scenes from a bitstream. For example, in a case of an AR scene, the renderer may obtain listening space information for the AR scene as a listener space description format (LSDF) file during playback.

Figure 2:
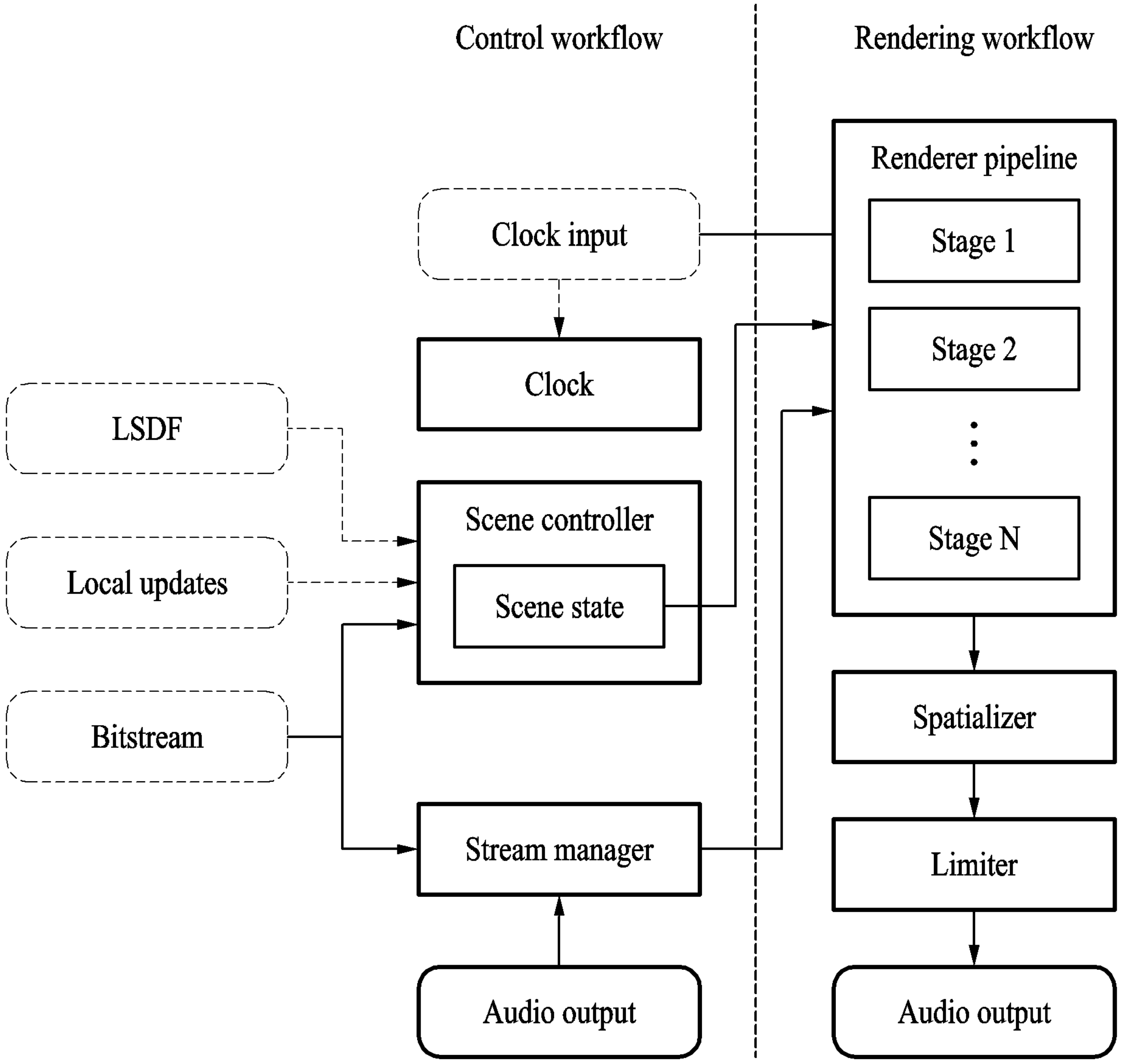
FIG. 2 is a diagram illustrating a control workflow and a rendering workflow of an audio signal processing apparatus according to various embodiments.

FIG. 2 is a diagram illustrating a control workflow and a rendering workflow of an audio signal processing apparatus according to various embodiments.

According to an embodiment, an audio signal processing apparatus may render an object audio using an object audio signal and metadata. The audio signal processing apparatus may mean, for example, a renderer.

For example, the audio signal processing apparatus may perform the real-time auralization of a 6DoF audio scene in which the user may directly interact with entities of a sound scene. The audio signal processing apparatus may render a VR or AR scene. In a case of the VR or AR scene, the audio signal processing apparatus may obtain metadata and audio scene information from a bitstream. In a case of the AR scene, the audio signal processing apparatus may obtain listening space information indicating where a user is positioned from an LSDF file.

As shown in FIG. 2, the audio signal processing apparatus may output an audio through the control workflow and the rendering workflow.

The control workflow is an entry point of the renderer, and the audio signal processing apparatus may interface with external system and components through the control workflow. The audio signal processing apparatus may adjust entities of the 6DoF scene using a scene controller in the control workflow and implement an interactive interface.

The audio signal processing apparatus may control a scene state. The scene state may reflect current states of all scene objects including audio elements, transforms/anchors, and geometry. The audio signal processing apparatus may create all objects of the entire scene before the rendering starts, and update metadata of all objects to a state in which a desired scene configuration is reflect at the start of the playback.

The audio signal processing apparatus may provide an integrated interface for renderer components, in order to access an audio stream connected to an audio element in the scene state using a stream manager. The audio stream may be input as a PCM float sample. A source of the audio stream may be, for example, a decoded MPEG-H audio stream or locally captured audio.

A clock may provide an interface for the renderer components, thereby providing a current scene time in seconds. A clock input may be, for example, a synchronization signal of another subsystem or an internal clock of the renderer.

The rendering workflow may generate an audio output signal. For example, the audio output signal may be a PCM float. The rendering workflow may be separated from the control workflow. The scene state for transferring all of the changes of the 6DoF scene and the stream manager for providing an input audio stream may access the rendering workflow for the communication between the two workflows (the control workflow and the rendering workflow).

A renderer pipeline may auralize the input audio stream provided by the stream manager based on the current scene state. For example, the rendering may be performed according to a sequential pipeline such that individual renderer stages exhibit independent perceptual effects and use processes previous and subsequent stages.

A spatializer may end the renderer pipeline and auralize an output of the renderer stage to a single output audio stream suitable for a desired playback method (e.g., binaural or loudspeaker playback).

A limiter may provide a clipping protection function for the auralized output signal.

Figure 3:
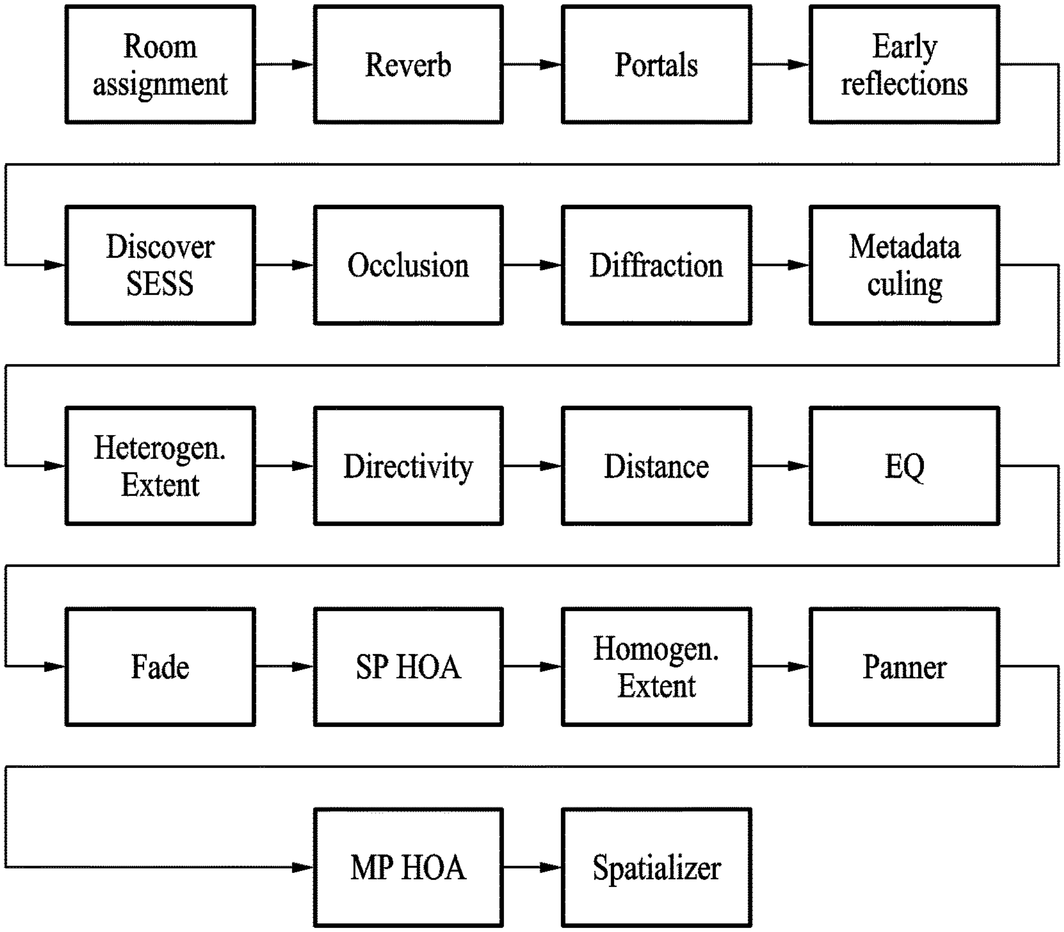
FIG. 3 is a diagram illustrating a renderer pipeline according to various embodiments.

FIG. 3 is a diagram illustrating a renderer pipeline according to various embodiments.

For example, each renderer stage of the renderer pipeline may be performed according to a set order. For example, the renderer pipeline may include stages of room assignment, reverb, portal, early reflection, discover spatially extended sound sources (SESS), occlusion (obstruction), diffraction, metadata culling, multi-volume sound source (heterogeny. extent), directivity, distance, equalizer (EQ), fade, single-point higher order ambisonics (SP HOA), homogenous volume sound source (homogen. extent), panner, and multi-point higher order ambisonics (MP HOA).

For example, the audio signal processing apparatus may render a gain, propagation delay, and medium absorption of an object audio according to a distance between an object audio and a listener in a rendering workflow (e.g., the rendering workflow of FIG. 2). For example, the audio signal processing apparatus may determine at least one of the gain, propagation delay, or medium absorption of the object audio in the stage of distance of the renderer pipeline.

The audio signal processing apparatus may calculate a distance between each render item (RI) and a listener in the stage of distance and interpolate a distance between update routine calls of an object audio stream based on a constant-velocity model. The RI may refer to all audio elements in the renderer pipeline.

The audio signal processing apparatus may apply the propagation delay to a signal associated with the RI in order to obtain physically accurate delay and the Doppler effect.

The audio signal processing apparatus may apply distance attenuation to model frequency-independent attenuation of an audio element due to geometric spread of source energy. The audio signal processing apparatus may use a model considering a level of a sound source, for the distance attenuation of a geometrically extended sound source.

The audio signal processing apparatus may apply the medium absorption to the object audio by modeling frequency-dependent attenuation of an audio element associated with air absorption characteristics.

The audio signal processing apparatus may determine the gain of the object audio by applying the distance attenuation according to the distance between the object audio and the listener. The audio signal processing apparatus may apply the distance attenuation due to geometric spread by using a parametric model considering the level of a sound source.

When the audio is reproduced in a 6DoF environment, a sound level of the object audio may vary depending on the distance, and the level of the object audio may be determined according to the 1/r law in which the level decreases in inverse proportion to the distance. For example, the audio signal processing apparatus may determine the level of the object audio according to the 1/r law in a region where the distance between the object audio and the listener is more than a minimum distance and less than a maximum distance. The minimum distance and the maximum distance may refer to distances set to apply the attenuation according to the distance, the propagation delay, and an air absorption effect.

For example, the audio signal processing apparatus may identify a position of the listener (e.g., three-dimensional (3D) space information), a position of the object audio (e.g., 3D space information), a speed of the object audio, and the like by using metadata. The audio signal processing apparatus may calculate a distance between the listener and the object audio by using the position of the listener and the position of the object audio.

The level of an audio signal delivered to the listener varies depending on the distance between an audio source (e.g., the position of the object audio) and the listener. For example, in general, the level of a sound delivered to the listener at a distance of 2 meters (m) from the audio source is smaller than the level of a sound delivered to the listener at a distance of 1 m. In a free field environment, a sound level decreases at a ratio of 1/r (here, r is a distance between the object audio and the listener). If the distance between a source and the listener doubles, the level of the sound heard by the listener decreases by approximately 6 decibel (dB).

The law of attenuation of the level of a sound with respect to the distance may be applied to a 6DoF VR environment. The audio signal processing apparatus may use a method of reducing the level of one object audio signal, when it is far from the listener, and increasing the level thereof, when it becomes close to the listener.

For example, it is assumed that a sound pressure level of a sound heard by the listener is 0 dB when the listener is 1 m away from the audio object. If the listener is 2 m away from the object, a change of the sound pressure level to −6 dB may make the listener feel that the sound pressure naturally decreases.

For example, when the distance between the object audio and the listener is more than the minimum distance and less than the maximum distance, the audio signal processing apparatus may determine the gain of the object audio according to Equation 1 below. In Equation 1 below, "reference_distance" may represent a reference distance, and "current distance" may represent a distance between the object audio and the listener. The reference distance may refer to a distance at which the gain of the object audio becomes 0 dB, and may be set differently for each object audio. For example, the metadata may include a reference distance of the object audio.

$$\text{Gain[dB]}=20\log(\text{referenced\_distance}/\text{current\_distance}) \quad \text{[Equation 1]}$$

For example, the RI may refer to an element acoustically activated in a scene. The RI may be a primary RI, that is, an RI directly derived from an audio element in a scene, or may be a secondary RI, that is, an RI derived from another RI (e.g., reflection or diffraction path). The RI attributes may be those shown in Table 1 below.

TABLE 1

| Field name | Data type | Description | Default value |
|---|---|---|---|
| idx | const int | Unique identifier of the RI | — |
| status | Item Status | The status of the RI (see Item Status type description) | — |
| type | Item Type | The type of the RI (see ItemType type description) | — |
| changed | ItemProperty | Flags to mark changed properties of the RI (see ItemProperty type description) | — |
| aparams | AParam | Flags to mark special rendering instructions for the RI (see AParam type description) | — |
| reverbId | int | Identifier of the reverberation environment this RI is located in (special value −1 if the RI is outside of all reverberation environments in the scene) | −1 |
| trajectory | Trajectory | Optional constant-velocity trajectory to interpolate the location of the RI between successive calls to the update( ) routine | None |
| teleport | bool | Whether or not this RI should be handled as teleported | false |
| position | Position | The position (location and orientation) of the RI in global coordinates (see Position type description) | — |
| apparentDistance Delta | float | Compensation for the distance to the listener for synchronizing multiple RIs with different locations in terms of their propagation delay and distance attenuation | 0 |
| refDistance | float | Reference distance for the distance attenuation model | 1 |
| signal | StreamBuffer | Reference to a StreamBuffer instance (see Stream Manager section) | — |
| eq | List<float> | Frequency-dependent gain for the signal associated with this RI in globally defined bands (see Equalizer section) | N × 1 |
| gain | float | Global frequency-independent gain for the signal associated with this RI | 1 |
| directivity | Directivity | Optional reference to a Directivity representation for the RI (see Directivity type description) | None |
| directiveness | float | Parameter to control the frequency-independent intensity of the Directivity | 1 |
| extent | Geometry | Optional reference to a Geometry that describes the extent of the RI | None |
| extentLayout | ExtentLayout | Reference to the channel layout of a heterogeneous extended source | None |
| rayHits | List<RayHit> | Data structure to aid the processing of extended sources (see respective stages) | Empty |
| reflectionInfo | ReflectionInfo | Optional reference to a special struct that contains information about the reflection path this RI represents (see 6.6.4) | None |
| occlusionInfo | OcclusionInfo | Optional reference to a special struct that contains information about the occlusion of this RI (see 6.6.6) | None |

TABLE 1-continued

| Field name | Data type | Description | Default value |
|---|---|---|---|
| channelPositions | List<Position> | | None |
| hoaInfo | HoaInfo | Optional reference to a special struct that contains information about the HOA source this RI represents (see 6.6.15) | None |

For example, the RI may include ItemStatus. The ItemStatus may be processed to an active state in the renderer stage. When the ItemStatus is different from a state of a previous update call (update( ) call), a changed flag may be set according to the changed state of the ItemStatus.

For example, the RI may include ItemType. When the ItemType is primary, it may indicate that the RI is directly derived from an object in a scene. When the ItemType is reflection, it may indicate that the RI is a secondary RI derived by specular reflection of another RI. When the ItemType is diffraction, it may indicate that the RI is a secondary RI derived from a geometrically diffracted path of another RI.

Figure 4:
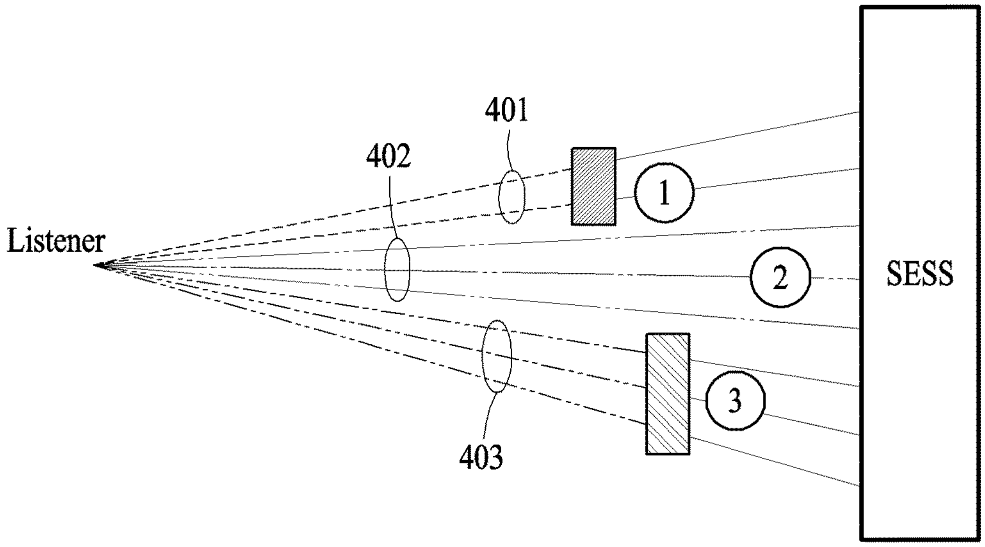
FIG. 4 is a diagram illustrating ray bundles for spatially extended sound sources (SESS) according to an embodiment.

FIG. 4 is a diagram illustrating ray bundles for SESS according to an embodiment.

The renderer may use parameterized geometry data for an acoustic description of a scene. The renderer may use geometrical data for high-quality auralization in several renderer stages (e.g., the stages of early reflections, occlusion, diffraction, and the like).

The renderer may perform the rendering stage through a combination of intersection test, ray tracing, and filtering based on geometry and acoustic materials of geometry.

When the transmission and decoding of the geometrical data is complete, the geometry may be input to a framework that the RI may refer to and query. The definition of geometrical parameters may be determined according to an encoder input format.

For example, the renderer may determine whether a line of sight between the RI corresponding to the audio element and the listener is visible based on the bitstream. The renderer may identify the RI corresponding to the audio element and the listener by using metadata included in the bitstream. The RI may represent an audio element in the render pipeline.

The renderer may determine or identify occlusion information for a direct path (the line of sight) from a source to the listener in the occlusion stage. When a corresponding straight line is occluded by an acoustically opaque or partially transparent object, the renderer may update geometry/mesh information obtained along the line of sight in a dedicated data structure. After updating the dedicated data structure, the renderer may update a state flag of the RI, for example, a control of fade-in/out process and related EQ.

For an extended source, the renderer may generate a plurality of ray bundles each corresponding to an occluding material encountered due to ray-cast from the listener to the geometry representing an extent. Each bundle may be provided together with an EQ curve based on transmission characteristics of the occluding material in a corresponding list. The data may be used in the homogeneous extent stage to generate a final binaural signal by combining occluded and un-occluded parts of the extent.

For example, FIG. 4 shows three bundles for the SESS. A bundle 1 (401) and a bundle 3 (403) correspond to two different occluders, each of them may have its own EQ curve corresponding to a transmission attribute of each occluder. The bundle 2 (402) is unoccluded and has no further processing on its contribution.

The renderer may determine or identify information necessary to generate a diffracted sound from a hidden source to the listener around an occluding object in the diffraction stage.

The renderer may use pre-processed geometrical data from a bitstream including edges, paths, and voxel data in the diffraction stage. The pre-processed geometrical data may be used to efficiently identify a relevant diffraction path from a given source to the position of the listener during the rendering. The renderer may create a relevant additional RI for the diffraction by using the diffraction path.

In a case of a static source, the renderer may rapidly calculate the relevant diffraction path from the source to the position of the listener at runtime by using a pre-calculated path stored in the corresponding voxel data.

In a case of a dynamic source, the renderer may find a precomputed edge visible at the positions of the source and the listener by using a ray tracing technique. The precomputed edge may be used to fetch and evaluate the relevant path before creating an RI.

The renderer may determine whether to activate a diffraction path finding process based on the absence of a visible line of sight in the diffraction stage, by using line-of-sight occlusion information provided in the occlusion stage.

The renderer may use data elements such as sources, a listener, meshes, and diffrPayload in the diffraction stage.

For example, the sources may be a map of a source-type object in which each source object is instantiated in a default RI of renderList and a corresponding key is a unique ID of a corresponding item. The source object may include a list of variables (e.g., global positions of previous and current time frames, a speed, current orientation, unique source ID, a flag of a relocation status of a previous time frame, a source status for confirming whether it is active or inactive, a source type, a visible edge list and a path index list, a flag (isPreviouslyOccluded) indicating an occlusion state of a previous time frame, and a flag (isocclusionStateChanged) indicating whether the occlusion state has been changed after the previous time frame). Each source object information may be updated for each frame.

For example, the listener may be a unique pointer for a listener-type object including the position, orientation, relevant visible edges list, and flag indicating whether the position of the listener has been changed after a last time frame. The listener-type object may be updated every update period.

For example, the meshes are all non-transparent static and dynamic meshes, and may indicate a vector including a mesh of a scene used to instantiate an Embree tracer for visibility check.

For example, diffrPayload may be a shared pointer for a diffraction payload object including preprocessed bitstream data including a static edge, such as, staticEdgeList, a dynamic edge, such as, dynamicEdgeDict, paths around static meshes, such as, staticPathDict, paths around dynamic meshes, such as, dynamicPathDict, a source-visible edge, such as, sourceEdgeDict, a listener-visible edge, such as listenerEdgeDict, and a valid path from a static source to a given position of the listener, such as validPathDict. diffrPayload needs to be set appropriately before calling an updated thread, but may be set after the diffraction payload object is generated in the bitstream.

For example, the renderer may perform the RI updates and audio processing in two different threads in the diffraction stage. Compared to other stages, such as, the homogeneous stage, the diffraction stage may only be called within the updated thread to create a secondary diffraction-type RI. After a diffraction-relevant variable is appropriately initialized, an RI update function of the diffraction stage may be called in a designated update period.

Figure 5:
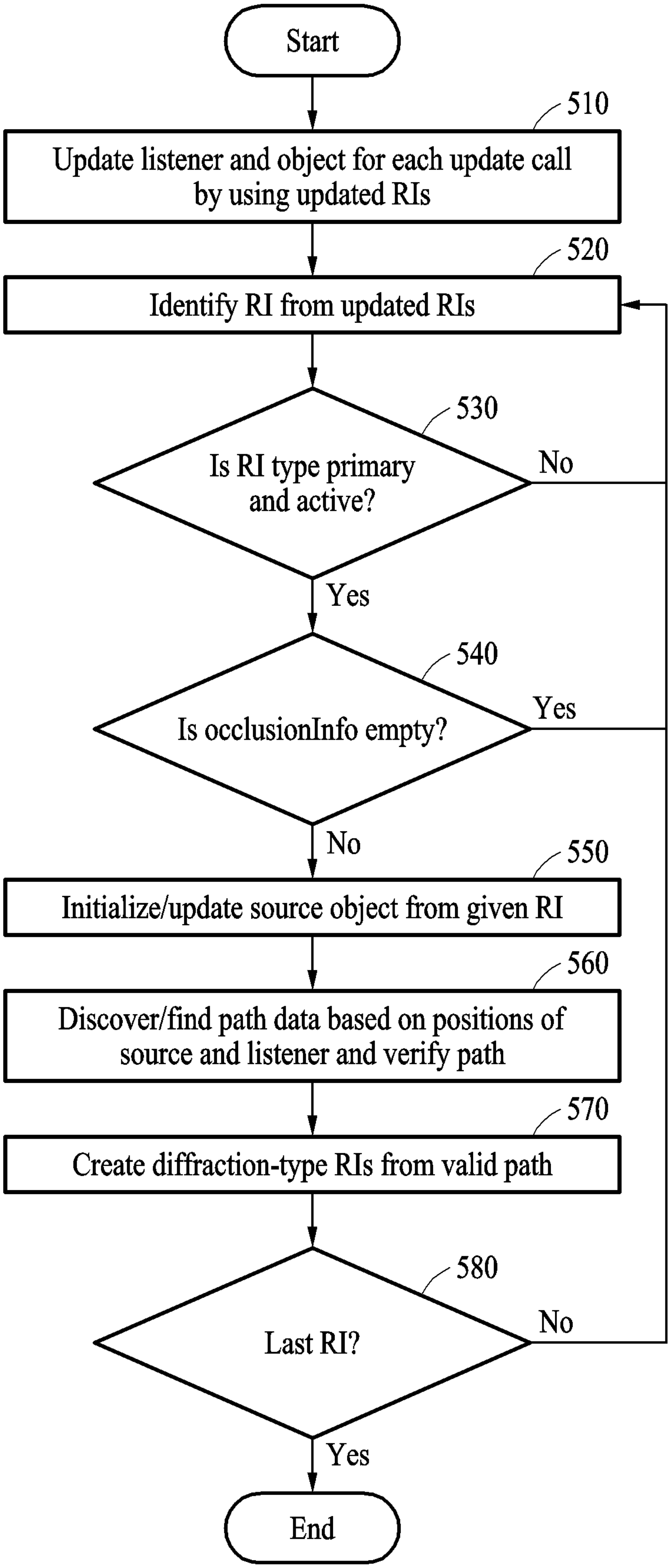
FIG. 5 is a flowchart illustrating an operation of creating a diffraction-type render item according to an embodiment.

FIG. 5 is a flowchart illustrating an operation of creating a diffraction-type RI according to an embodiment.

For example, as shown in FIG. 5, the renderer may perform an update process of creating a diffraction-type RI by using an active primary RI based on a source, a listener, and pre-calculated path information.

An update function for creating the diffraction-type RI may be called together with renderList as an input including listener-relevant information, such as, the RI, the position, and the orientation. For example, in operation 510, the renderer may update a listener and an object every update call by using updated Ms. In every update call, the listener may be updated from the listener of renderList.

In operation 520, the renderer may identify an RI from the updated Ms.

The RI in renderList may include, for example, a default RI and a secondary RI derived from the primary RI according to the pipeline such as a reflection-type, diffraction-type, or portal-type RI. The renderer may support the rendering of a sound diffracted from a primary RI that is a point source or an extension source in the diffraction stage.

The renderer may omit the path-finding and new diffraction-type RI creation in the loop for the RI in FIG. 5. For example, when the type of a given RI is not primary, the renderer may skip the path-finding and the new diffraction-type RI creation in the corresponding loop for the RI and check a next RI according to the operation shown in FIG. 5. In addition, when a given RI in the loop is defined in a listener coordinate system (LCS), the renderer may omit an LCS-based RI, assuming that the corresponding RI is not affected by geometry. The state of the given RI indicating whether the RI is active or inactive may be changed at runtime. When the state of the given RI is inactive, a previously created diffraction-type RI may be removed in order not to render a sound diffracted from the inactive primary RI.

In operation 530, the renderer may identify whether the RI is primary and active. When the given RI is primary and active, a source-type object may be instantiated in the given RI and stored in a source (e.g., a vector of a source object). When the source-type object corresponding to the given RI exists in a source, the source object in the corresponding source may be updated. The source-type object may include position information, an occlusion flag, and a path-relevant variable. The position information may be directly updated in the given RI and other source variables may be updated later in an update thread. An RTDiffractionTracker object may be instantiated to an initialized source object, a listener, eifPayLoad and diffrPayLoad, and may track a path with the updated source and listener information.

In operation 540, the renderer may identify occlusion information. The renderer may call the process of the path-finding and diffraction-type RI creation only when the line of sight from the listener to the given primary RI (that is, the primary source) is invisible, based on the occlusion information. In this regard, the renderer may check occlusionInfo including updated occlusion-relevant information, such as occluded surfaces' material and a corresponding material EQ along the line of sight.

For example, when occlusionInfo is empty, which indicates that there are no occluded surfaces along the line of sight, the render may remove the diffraction-type RI stored in itemStore, in order not to render an invalid diffraction-type RI in the current time frame. An occlusion flag, isPreviouslyOccluded, of the source may be set to false for a next update period. For example, isPreviouslyOccluded may indicate whether the line of sight between the corresponding primary RI and the listener is visible in the previous update call. When isPreviouslyOccluded is set to false, it may indicate that the line of sight between the corresponding primary RI and the listener is visible in the previous update call.

For example, when occlusionInfo is not empty and isPreviouslyOccluded is false, isoccludedStateChanged may be updated to true. When occlusionInfo is empty and ispreviouslyOccluded is true, isoccludedStateChanged may be set to false. isoccludedStateChanged may indicate whether occlusionInfo is the same as ispreviouslyOccluded.

The renderer may determine whether to perform operations 550 to 570 based on at least one of occlusionInfo, isPreviouslyOccluded, or isoccludedStateChanged, or a combination thereof. For example, the renderer may call the process of path finding and diffraction-type RI creation based on at least one of occlusionInfo, isPreviouslyOccluded, or isOccludedStateChanged, or a combination thereof. For example, when occlusionInfo is not empty, the renderer may perform operation 550.

In operation 550, the renderer may initialize or update a source object from the RI. For example, when the given primary RI is occluded (e.g., occlusionInfo is not empty) and the type thereof is a point source, the renderer may update diffrItemInitialEQs using the EQ of the updated RI in order to render the sound through acoustically transparent or non-transparent surfaces. The renderer may update diffrItemInitialEQs in consideration of the EQ of an occluded surface material in a previous occlusion stage. diffrItemInitialEQs may be updated as shown in Table 2 below.

TABLE 2

```
for (int i = 0; i < diffrItemInitialEQs.size( ); i++) {
  diffrItemInitialEQs[i] = 1.0 − RI.EQs[i];
}
```

In Table 2, RI.EQs may include an EQ coefficient of the corresponding RI updated in the occlusion stage.

When the RI corresponds to an extended source, the renderer may additionally check which part of the source extent is visible to the listener. The ratio of the invisible surface to the original surface of a given extended source may be used to adjust the gain of the diffraction-type RI.

Besides an additional gain, it may be assumed that the extended source is composed of spatially equally distributed point sources. This calculation may be performed by calculating a hit ray that is cast to test a sample point stored in IntersectionTestSamples per specified source extent at the position of the listener by using ray tracing.

For example, when there are N ray-hits in M samples stored in IntersectionTestSamples[extentID], extentID is an ID of the source extent of the given RI, and the entity of diffrItemInitialEQs may be multiplied by 1-NI M. Also, a center of the occluded part of the source extent may be calculated by using an occluded test sample to update the position of the source. In a case of an extended source, such two operations may be necessary to render a diffracted sound without artifacts such as a unrealistic sound level changes behind the occluding geometry. IntersectionTestSamples may be initialized with a pair of a source extent ID as a key and a sample position as a value. Here, the sample position may be updated to intersections between a given source extent and rays which are cast out from a center position of the source to uniformly distributed directions using azimuth and elevation angles.

In operation 560, the renderer may discover or find path data based on the positions of the source and the listener. For example, the renderer may update relevant diffraction path information according to the positions of the RI and the listener, after diffrItemInitialEQ and source position are updated. In operation 560, the renderer may determine whether a path found is valid.

In operation 570, the renderer may create a diffraction-type RI from the valid path. In operation 580, the renderer may identify whether the corresponding RI is a last RI in the RIs. When the RI is the last Ri in the RIs, the renderer may end the process. In operation 520, when the RI is not the last RI in the RIs, the renderer may identify a next RI in the Ms.

An audio element may include audio signal data. The audio signal data may correspond to three signal types (e.g., an audio object, channel, and HOA).

An audio scene may represent all of audio elements, acoustic elements, and an acoustic environment necessary to render a sound in a scene.

The renderer may generate an audio signal by rendering a diffraction-type RI corresponding to the RI. The renderer may create the diffraction-type RI based on a valid path. The diffraction-type RI may be created based on a path through which a diffraction sound reaches the listener from the source.

For example, the diffraction-type RI may include a position, orientation, and filter EQ. The position, orientation, and filter EQ included in the diffraction-type RI may be generated based on the valid path (e.g., a length, a diffraction angle, or the like of the path).

The renderer may control the diffraction sound based on the diffraction-type RI. The renderer may render the diffraction sound using the position, orientation, and filter EQ included in the diffraction-type RI. The renderer may generate an audio signal using rendered diffraction sound, direct sound, reflection sound, reverberation sound, and the like.

Figure 6:
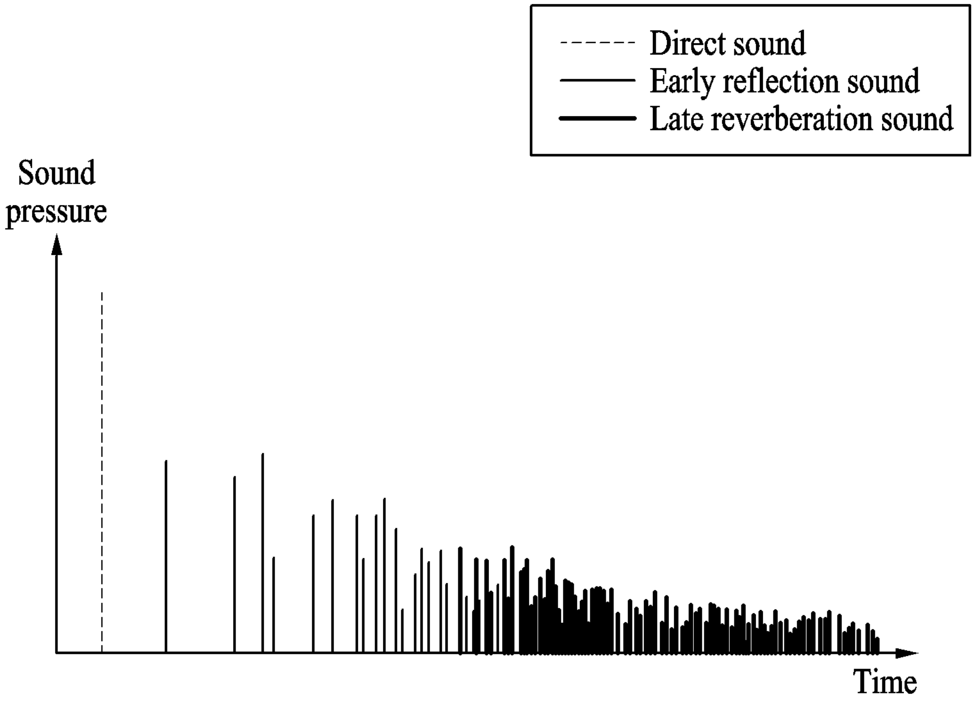
FIG. 6 is a diagram illustrating an impulse response of a direct sound, an early reflection sound, and a late reverberation sound according to an embodiment.

FIG. 6 is a diagram illustrating an impulse response of a direct sound, an early reflection sound, and a late reverberation sound according to an embodiment.

Acoustic space information may be information used to simulate the acoustic characteristics of the space in a more excellent manner. However, a complex operation is required to simulate acoustic transmission characteristics by using the acoustic spatial information. Accordingly, to simply generate the space acoustic transmission characteristics, the space acoustic transmission characteristics may be divided into the direct sound, early reflection sound, and late reverberation sound, and the early reflection sound and the late reverberation sound may be generated by using the provided acoustic space information.

For example, as shown in FIG. 6, the renderer may generate an impulse response, which is the space acoustic transmission characteristic, according to the direct sound, early reflection sound, and reverberation sound.

The renderer may perform sound processing according to occlusion. For example, the sound processing according to the occlusion may include sound processing according to diffraction, distribution, and the like.

The description regarding the renderer with reference to FIGS. 1 to 6 may be substantially equally applied to an audio signal processing apparatus.

Figure 7:
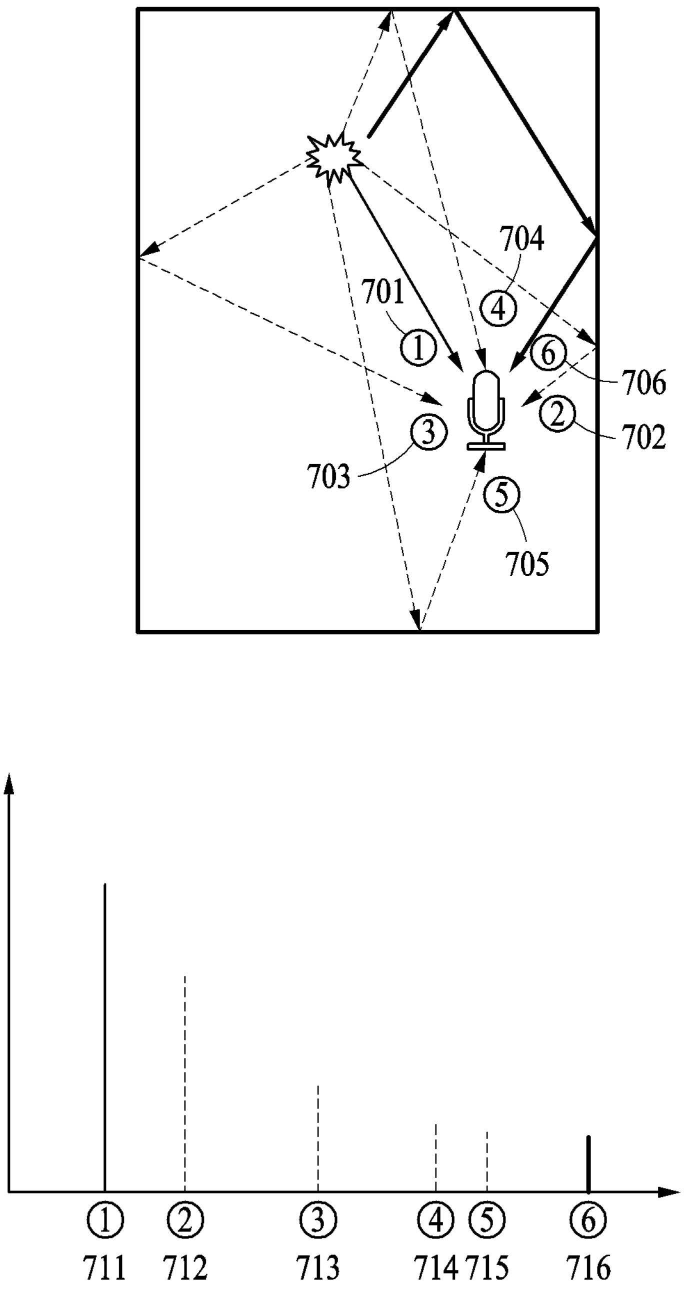
FIG. 7 is a diagram illustrating paths of a direct sound, a direct reflection sound, and a late reverberation sound, and impulse responses.

FIG. 7 is a diagram illustrating paths of a direct sound 701, direct reflection sounds 702, 703, 704, and 705, and a late reverberation sound 706, and impulse responses.

When geometry information (e.g., an object affecting transmission of a sound) for the space acoustic reproduction is given, the audio signal processing apparatus may calculate a direct sound and a direct reflection sound.

For example, the audio signal processing apparatus may generate a direct sound and a direct reflection sound between a sound source and a user using a ray tracing method. The audio signal processing apparatus may use characteristics that a sound is reflected when it hits an object, to obtain an impulse response between the sound source and the user.

For example, the audio signal processing apparatus may generate an impulse response 711 of the direct sound 701, impulse responses 712, 713, 714, and 715 of the reflection sounds 702, 703, 704, and 705, and an impulse response 716 of the late reverberation sound 706 based on geometry information shown in FIG. 7.

In an example, the audio signal processing apparatus may calculate a path of an object audio by using an image source method. For example, the image source method is a method of directly generating a reflection sound by assuming that a virtual space symmetrical with respect to a reflective surface of the object audio exists beyond the reflective surface.

The audio signal processing apparatus may calculate the path of the object audio by using ray tracing to which the image source method is applied. For example, a ray transmitter and a receiver are placed in a space, the audio signal processing apparatus may radiate a plurality of rays from the ray transmitter. When the radiated rays hit an object, they are reflected and delivered, and the audio signal processing apparatus may find a ray passing through the receiver among the radiate rays, and generate an impulse response by using a path through which the corresponding rays has passed.

FIGS. 8 to 11 are diagrams illustrating impulse responses of a direct sound and/or a diffraction sound according to an embodiment.

When an occlusion exists in an acoustic space, diffraction may occur. The diffraction indicates a phenomenon that occurs when a wave encounters an occlusion or opening. For example, the diffraction may be defined as the bending of a wave around a corner of an occlusion into a region of a geometrical shadow of the occlusion or the bending of a wave through an aperture into a region of a geometrical shadow of the aperture. Accordingly, even when there is an occlusion on a straight path between the object audio and the listener, the listener may hear the object audio due to the diffraction.

The sound transmission effect due to the diffraction may appear differently depending on relative angles and distances between the sound source, the occlusion, and the receiver (the listener), and a frequency of the sound. The sound transmission effect due to the diffraction may vary depending on conditions, the effect may be considerably attenuated due to the diffraction, and the sound transmitted by the diffraction may be very small depending on conditions.

When rendering the object audio, the audio signal processing apparatus may process the direct sound, the direct reflection sound, the late reverberation sound, and the like along with a diffraction effect. The effect due to the direct sound, the direct reflection sound, the late reverberation sound, the diffraction, or the like may vary depending on the geometry information of the space or the positions of the sound source and the listener. The audio signal processing apparatus may efficiently perform audio signal processing in consideration of the geometry information of the space or the effect due to the positions of the sound source or the listener.

In FIGS. 8 to 11 below, an audio signal transmitted by the diffraction (e.g., a diffraction sound) may have a relatively low gain compared to a gain of the direct sound due to the attenuation by the diffraction.

In FIGS. 8 to 11 below, a path through which the direct sound and the diffraction sound of the audio object are delivered from the audio object to the listener, and impulse responses of the direct sound and the diffraction sound are considered, and a path through which the reflection sound is delivered from the audio object to the listener and an impulse response of the reflection sound are not considered.

Figure 8:
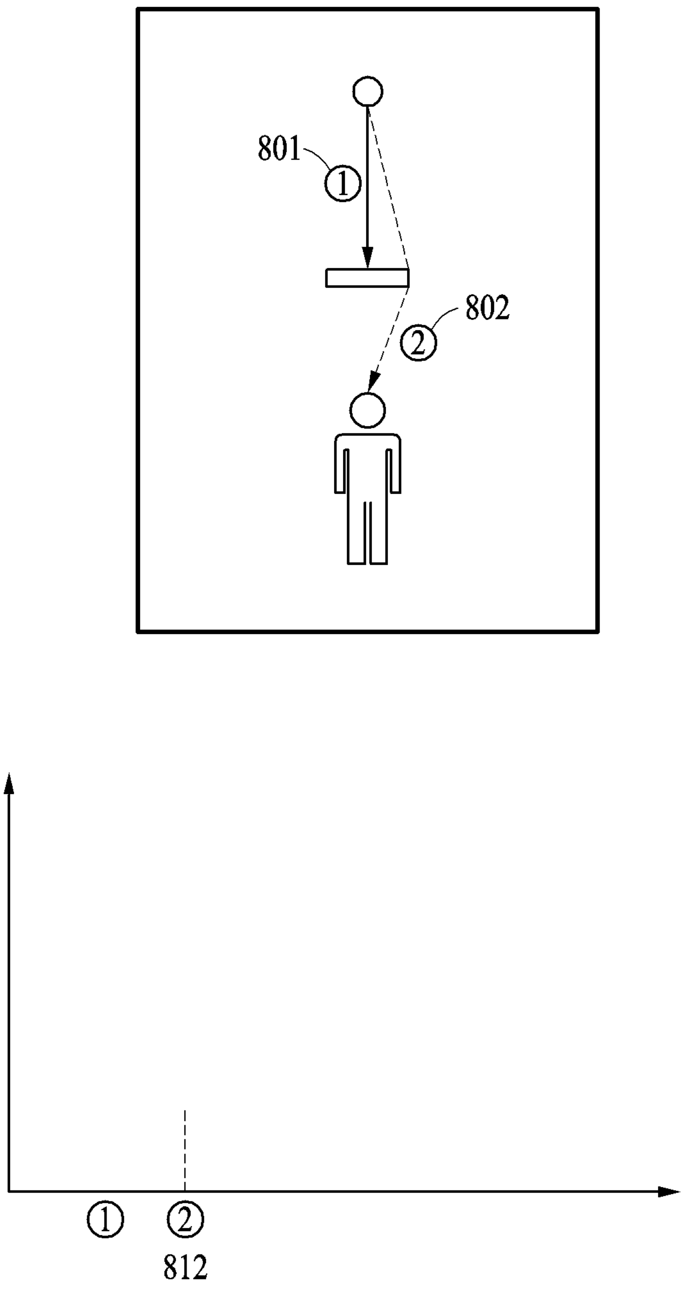
FIGS. 8 to 11 are diagrams illustrating impulse responses of a direct sound and/or a diffraction sound according to an embodiment.

FIG. 8 is an example showing space acoustic geometry information and impulse responses of a direct sound and/or a diffraction sound when an occlusion exists on a straight path between a listener and an audio object.

In FIG. 8, a path through which a direct sound 801 is delivered may be occluded by an occlusion, and a diffraction sound 802 may be delivered from the object audio to the listener. The diffraction occurring near the boundary of the occlusion may be delivered to the listener. Since the direct sound 801 is occluded by the occlusion, the audio signal processing apparatus may generate only an impulse response 812 by the diffraction sound 802.

Figure 9:
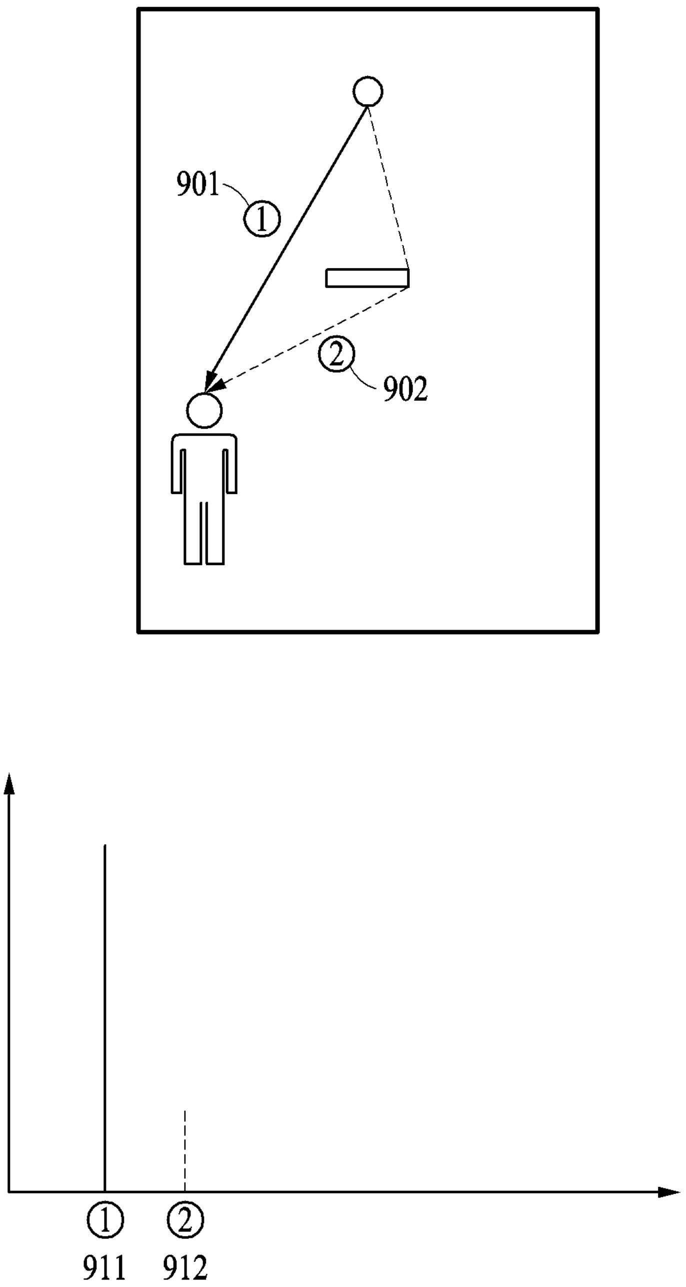

FIG. 9 is an example showing space acoustic geometry information and impulse responses of a direct sound and/or a diffraction sound when an occlusion does not exist on a straight path between a listener and an audio object.

In FIG. 9, a direct sound 901 and a diffraction sound 902 may reach the listener from the object audio. The diffraction occurring near the boundary of the occlusion may be delivered to the listener. The audio signal processing apparatus may generate an impulse response 911 by the direct sound 901 and an impulse response 912 by the diffraction sound 902.

Figure 10:
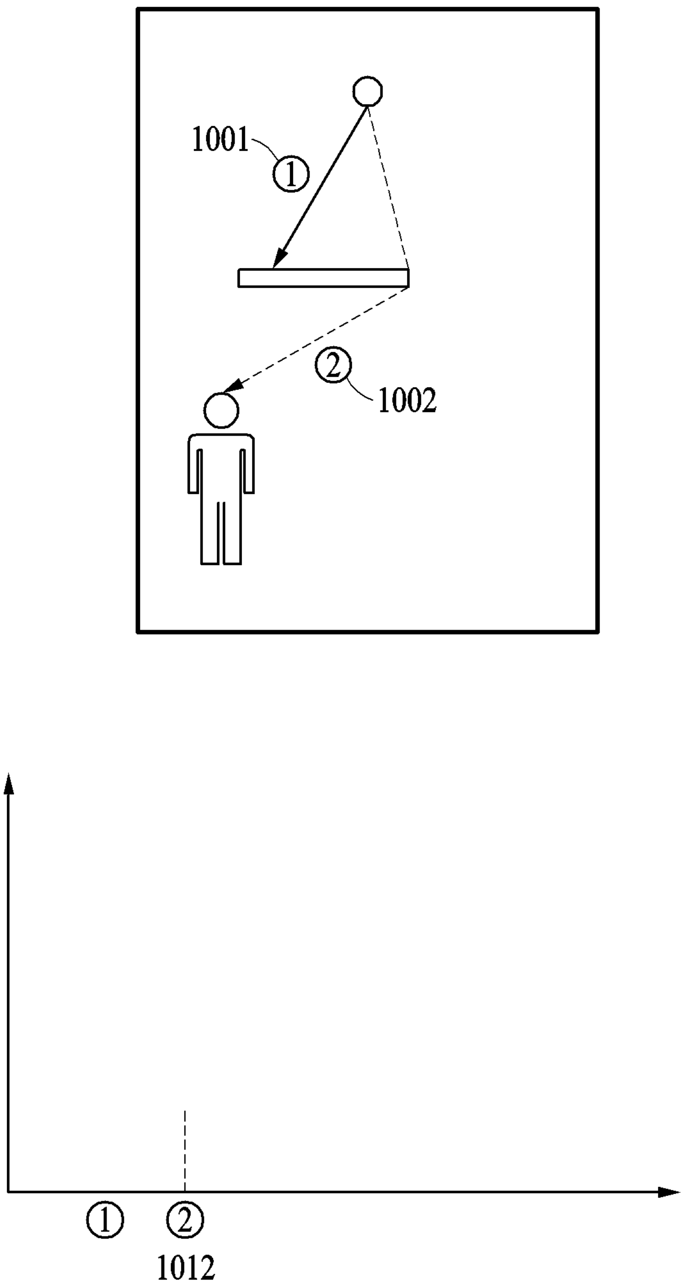

FIG. 10 is an example showing space acoustic geometry information and impulse responses of a direct sound and/or a diffraction sound when an occlusion exists on a straight path between a listener and an audio object.

In FIG. 10, a path through which a direct sound 1001 is delivered may be occluded by an occlusion, and a diffraction sound 1002 may be delivered from the object audio to the listener. Since the direct sound 1001 is occluded by the occlusion, the audio signal processing apparatus may generate only an impulse response 1012 by the diffraction sound 1002.

Referring to FIGS. 9 and 10, when there is no direct sound, the effect due to the diffraction may significantly affect on the impulse response, however, when there is a direct sound, the effect due to the diffraction has a lower gain, compared to the direct sound. Therefore, a small effect due to the diffraction may be confirmed.

Figure 11:
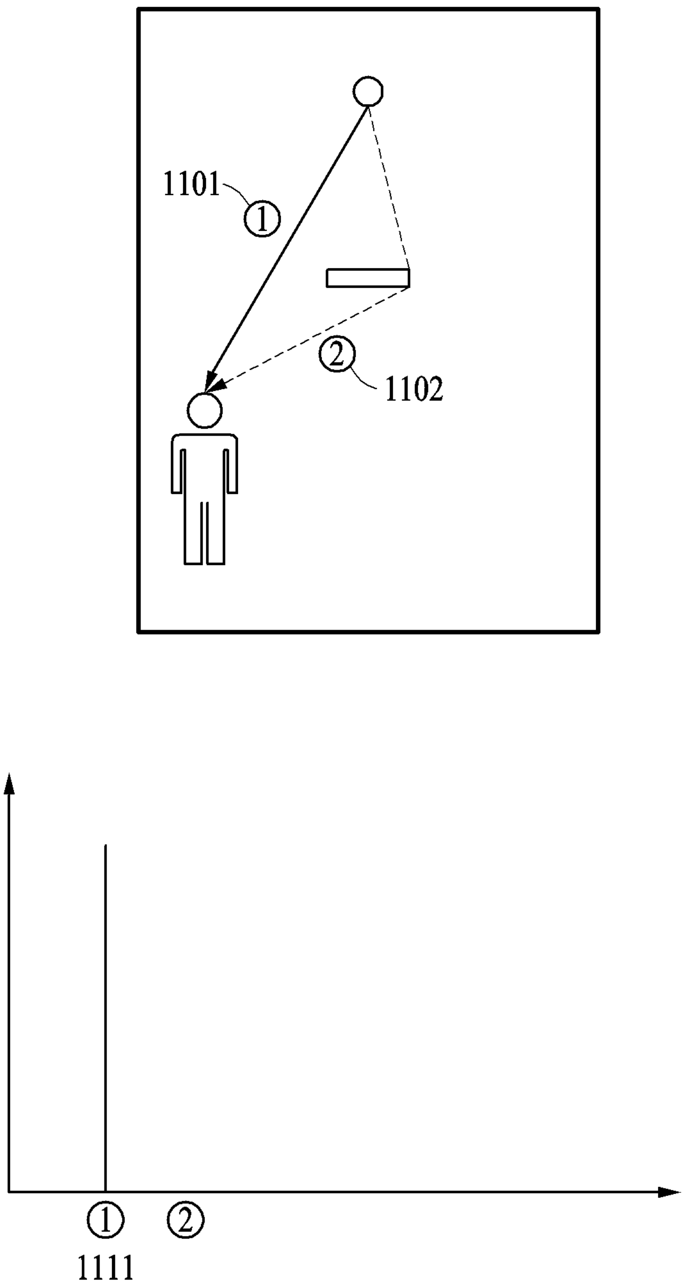

FIG. 11 is an example showing space acoustic geometry information and impulse responses of a direct sound and/or a diffraction sound when an occlusion does not exist on a straight path between a listener and an audio object.

In FIG. 11, a direct sound 1101 and a diffraction sound 1102 may reach the listener from the object audio. The audio signal processing apparatus may generate only an impulse response 1111 of the direct sound 1101. Since the direct sound 1101 reaches the listener, the audio signal processing apparatus may not generate an impulse response of the diffraction sound even if the diffraction sound 1102 reaches the listener from the object audio.

Referring to FIGS. 10 and 11, the audio signal processing apparatus according to an embodiment may check whether the direct sound of the audio object is directly delivered to the listener in performing the diffraction processing of the object audio. The audio signal processing apparatus may perform the diffraction processing when the direct sound of the audio object is not directly delivered to the listener due to an occlusion. The audio signal processing apparatus may not perform the diffraction processing when the direct sound of the audio object is directly delivered to the listener.

For example, the operation of the diffraction processing on the audio object performed by the audio signal processing apparatus may include finding a path through which a diffraction sound is delivered to the listener from the audio object in consideration of geometry information (e.g., a position of the listener, a position of the audio object, a position of an occlusion, etc.), determining whether the path through which the diffraction sound is delivered is valid, creating a diffraction-type RI based on the valid path, and generating an audio signal by rendering the diffraction-type RI.

The audio signal processing apparatus may determine whether a direct sound of the audio object is directly delivered to the listener by checking whether an occlusion exists on a shortest path between the sound source and the listener.

When an impulse response is calculated by a method such as ray tracing, the audio signal processing apparatus may determine whether the direct sound of the audio object is directly delivered to the listener by determining whether the response of a shortest path between the sound source and the listener is included in the impulse response calculated by the ray tracing or the like.

In FIG. 10, since the direct sound 1001 of the audio object is not delivered to the listener, the audio signal processing apparatus may perform the diffraction processing on the audio object and generate the impulse response 1012 of the diffraction sound 1002. In FIG. 10, the audio signal processing apparatus may generate an audio signal by using the impulse response 1012 of the diffraction sound 1002.

In FIG. 11, since the direct sound 1101 of the audio object is delivered to the listener, the audio signal processing apparatus may not perform the diffraction processing on the audio object and may not generate an impulse response of the diffraction sound 1102. In FIG. 11, the audio signal processing apparatus may generate an audio signal by using an impulse response 1111 of the direct sound 1101.

Figure 12:
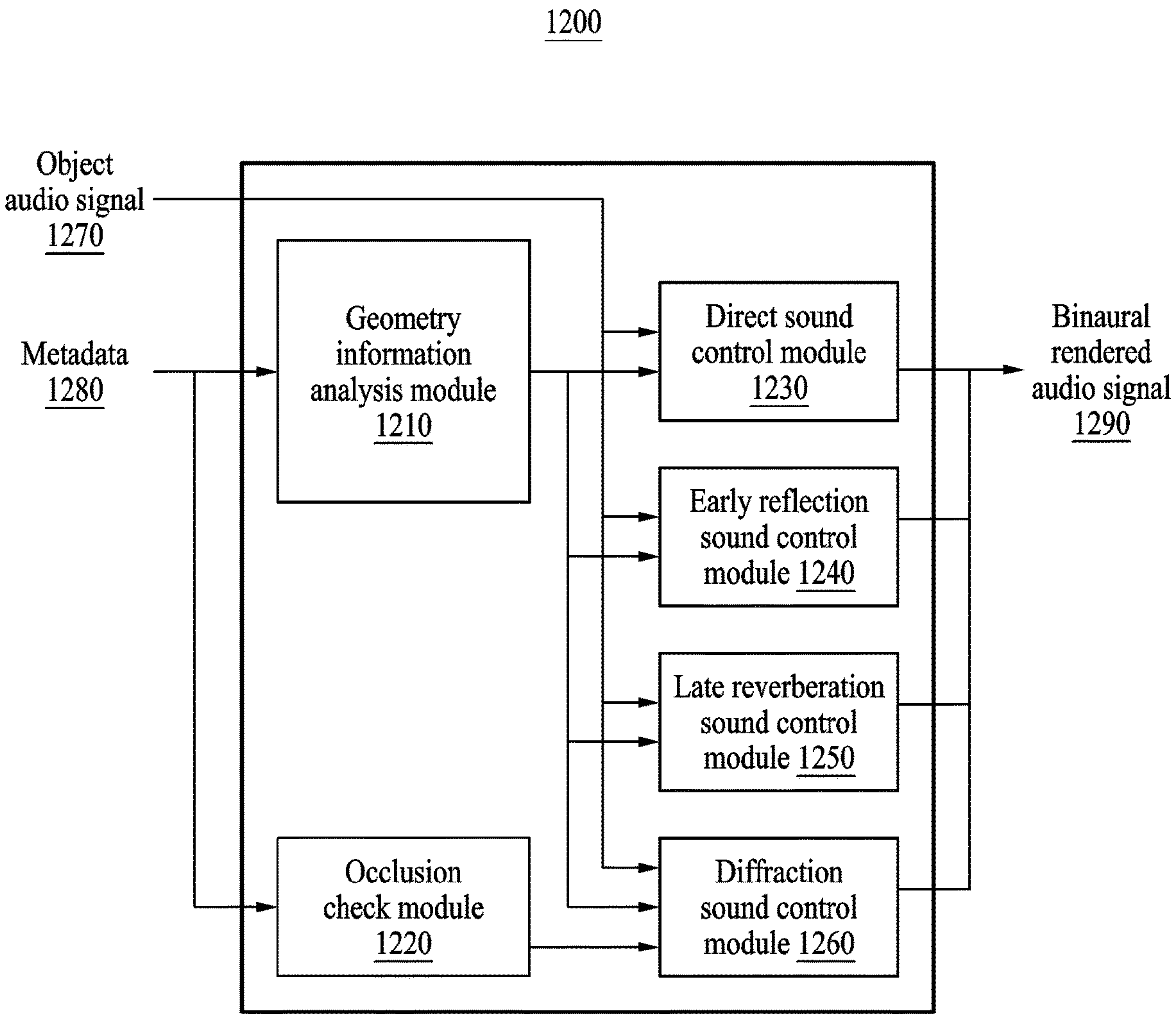
FIGS. 12 and 13 are schematic block diagrams of an audio signal processing apparatus according to an embodiment.
Figure 13:
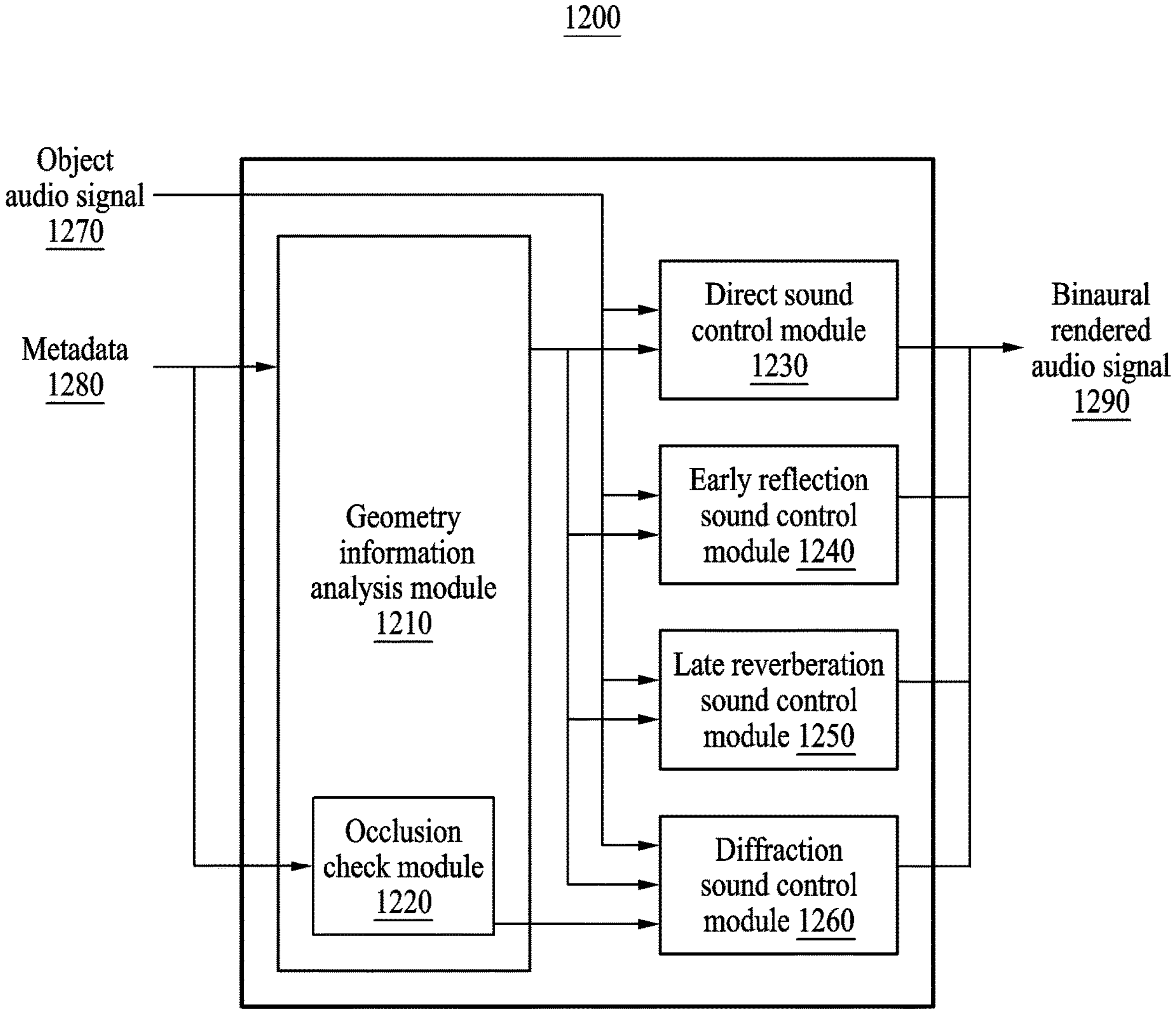

FIGS. 12 and 13 are schematic block diagrams of an audio signal processing apparatus 1200 according to an embodiment.

Referring to FIG. 12, the audio signal processing apparatus 1200 according to an embodiment may include at least one of a geometry information analysis module 1210, an occlusion check module 1220, a direct sound control module 1230, an early reflection sound control module 1240, a late reverberation sound control module 1250, or a diffraction sound control module 1260, or a combination thereof.

For example, a bitstream input to the audio signal processing apparatus 1200 may include an object audio signal 1270 and metadata 1280.

The geometry information analysis module 1210 may identify geometry data using metadata 1280. For example, the geometry data may include information on an object audio, listener, and object included in an acoustic scene.

For example, the metadata 1280 may include a gain, distance, acoustic geometry information, user/listener position, object position, and the like.

The obstacle check module 1220 may determine whether a line of sight between a RI corresponding to an audio element and the listener is visible using the metadata 1280.

The obstacle check module 1220 may determine whether the line of sight is visible using line-of-sight occlusion information based on a bitstream. For example, in a case of an extended source, the line-of-sight obstacle information may be determined based on a ray cast from the listener to the extended source (e.g., geometry). For example, when all ray bundles generated by the ray cast are occluded by an obstacle, the line-of-sight obstacle information may be determined that the line of sight between the RI and the listener is invisible. When at least one ray bundle generated by the ray cast is not obscured by the obstacle and is directly connected to the listener and the extended source, the line-of-sight obstacle information may be determined that the line of sight between the RI and the listener is visible.

The obstacle check module 1220 may determine whether the line of sight is visible based on whether the direct sound of the RI is directly delivered to the listener. For example, when the direct sound is directly delivered to the listener, the obstacle check module 1220 may determine that the line of sight is visible.

In addition, the obstacle check module 1220 may determine whether the line of sight is visible based on whether an obstacle exists in a shortest path between the RI and the listener. For example, when an obstacle exists in the shortest path, the obstacle check module 1220 may determine that the line of sight is invisible.

The direct sound control module 1230 may process a direct sound using the object audio signal 1270 and the direct sound control information. For example, the direct sound control module 1230 may render the direct sound based on the direct sound control information. The direct sound control information may be received from the geometry information analysis module 1210.

The early reflection sound control module 1240 may process the early reflection sound by using the object audio signal 1270 and early reflection sound control information. For example, the early reflection sound control module 1240 may render an early reflection sound based on early reflection sound control information. The early reflection sound control information may be received from the geometry information analysis module 1210.

The late reverberation sound control module 1250 may process a late reverberation sound by using the object audio signal 1270 and late reverberation sound control information. For example, the late reverberation sound control module 1250 may render the late reverberation sound based on the late reverberation sound control information. The late reverberation sound control information may be received from the geometry information analysis module 1210.

The diffraction sound control module 1260 may process a diffraction sound using the object audio signal 1270 and diffraction sound control information according to whether the line of sight between the RI and the listener is visible. The diffraction sound control information may be received from the geometry information analysis module 1210.

For example, the diffraction sound control module 1260 may not perform the diffraction sound processing when the line of sight is visible. When the line of sight is invisible, the diffraction sound control module 1260 may render the diffraction sound based on the diffraction sound control information.

The audio signal processing apparatus 1200 may generate an audio signal using the rendered direct sound, early reflection sound, late reverberation sound, and diffraction sound. According to an embodiment, when a mono object audio signal 1270 is input, the audio signal processing apparatus 1200 may output a binaural rendered audio signal 1290. The audio signal processing apparatus 1200 may output the rendered audio signal 1290 by synthesizing the rendered direct sound, early reflection sound, late reverberation sound, and diffraction sound.

FIG. 13 is a schematic block diagram of the audio signal processing apparatus 1200 according to an embodiment, although the descriptions regarding the geometry information analysis module 1210, the occlusion check module 1220, the direct sound control module 1230, the early reflection sound control module 1240, the late reverberation sound control module 1250, and the diffraction sound control module 1260 of the audio signal processing apparatus 1200 shown in FIG. 13 are omitted, the descriptions made above with reference to FIG. 12 may be applied substantially in the same manner.

As shown in FIG. 13, the geometry information analysis module 1210 of the audio signal processing apparatus 1200 may include the obstacle check module 1220. The geometry information analysis module 1210 may determine whether a line of sight between an RI corresponding to an audio element and a listener is visible using the metadata 1280 included in a bitstream. The diffraction sound control module 1260 may process a diffraction sound by using an object audio and diffraction sound control information according to whether the line of sight is visible that is received from the geometry information analysis module 1280.

In the description above with reference to FIGS. 12 and 13, the geometry information analysis module 1210, the obstacle check module 1220, the direct sound control module 1230, the early reflection sound control module 1240, the late reverberation sound control module 1250, the diffraction sound control module 1260 correspond to an example for describing the operations of the audio signal processing apparatus 1200. The audio signal processing apparatus 1200 shown in FIGS. 12 and 13 may be implemented with at least one apparatus or processor including processing circuitry.

Figure 14:
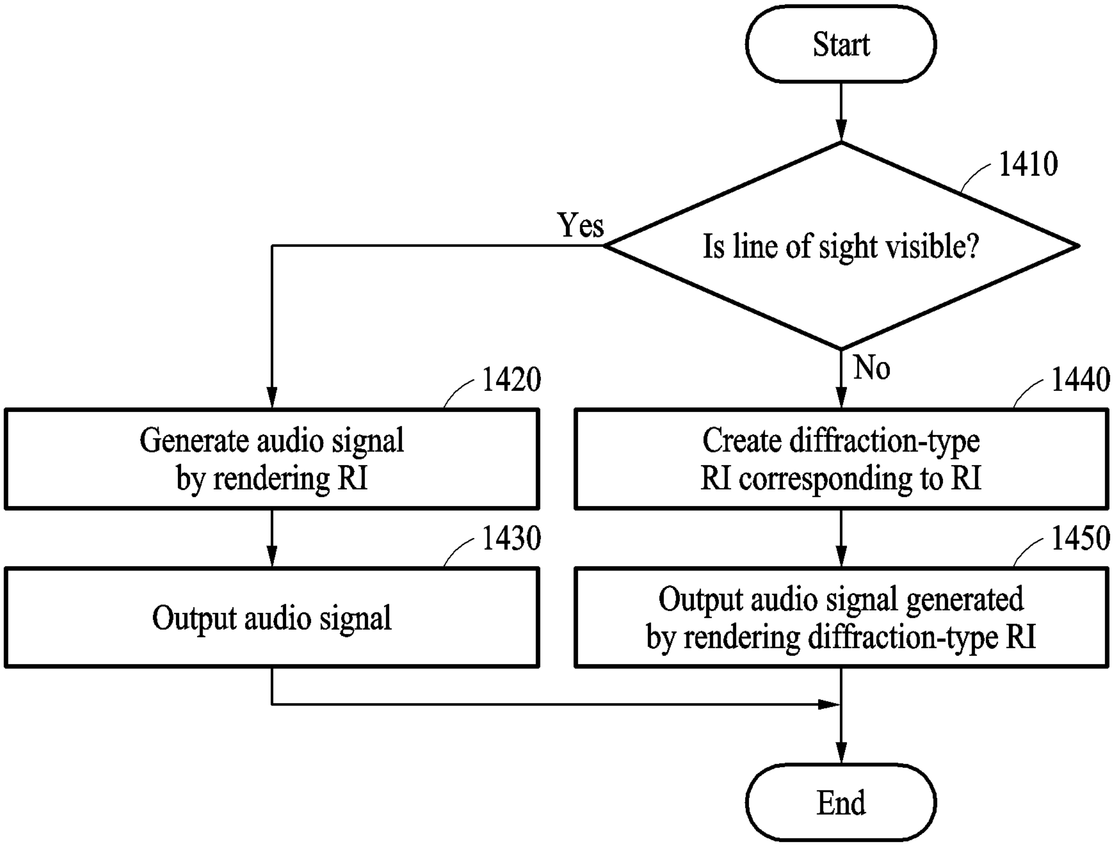
FIG. 14 is a flowchart illustrating an operation of an audio signal processing method according to an embodiment.

FIG. 14 is a flowchart illustrating an operation of an audio signal processing method according to an embodiment.

In operation 1410, the audio signal processing apparatus 1200 may determine whether a line of sight is visible. The line of sight indicates a line of sight between an RI corresponding to an audio element and a listener.

The audio signal processing apparatus 1200 may determine whether the line of sight is visible using line-of-sight occlusion information based on a bitstream.

The audio signal processing apparatus 1200 may determine whether a line of sight is visible based on whether a direct sound of the RI is directly delivered to the listener.

The audio signal processing apparatus 1200 may determine whether the line of sight is visible based on whether an impulse response between the RI and the listener includes a response of a shortest path between the RI and the listener.

For example, the audio signal processing apparatus 1200 may determine whether the line of sight is visible according to whether the response corresponding to the shortest path is included in a plurality of impulse responses.

In operation 1420, when the line of sight is visible in operation 1410, the audio signal processing apparatus 1200 may generate an audio signal by rendering the RI. For example, the audio signal processing apparatus 1200 may generate the audio signal by rendering the RI without creating a diffraction-type RI in response to the visible line of sight.

In operation 1430, the audio signal processing apparatus 1200 may output the audio signal. The audio signal output in operation 1430 is a signal generated by rendering the RI.

In operation 1440, in response to a case where the line of sight is invisible in operation 1410, the audio signal processing apparatus 1200 may create a diffraction-type RI corresponding to the RI.

In operation 1450, the audio signal processing apparatus 1200 may generate an audio signal by rendering a diffraction-type RI and output the audio signal.

Figure 15:
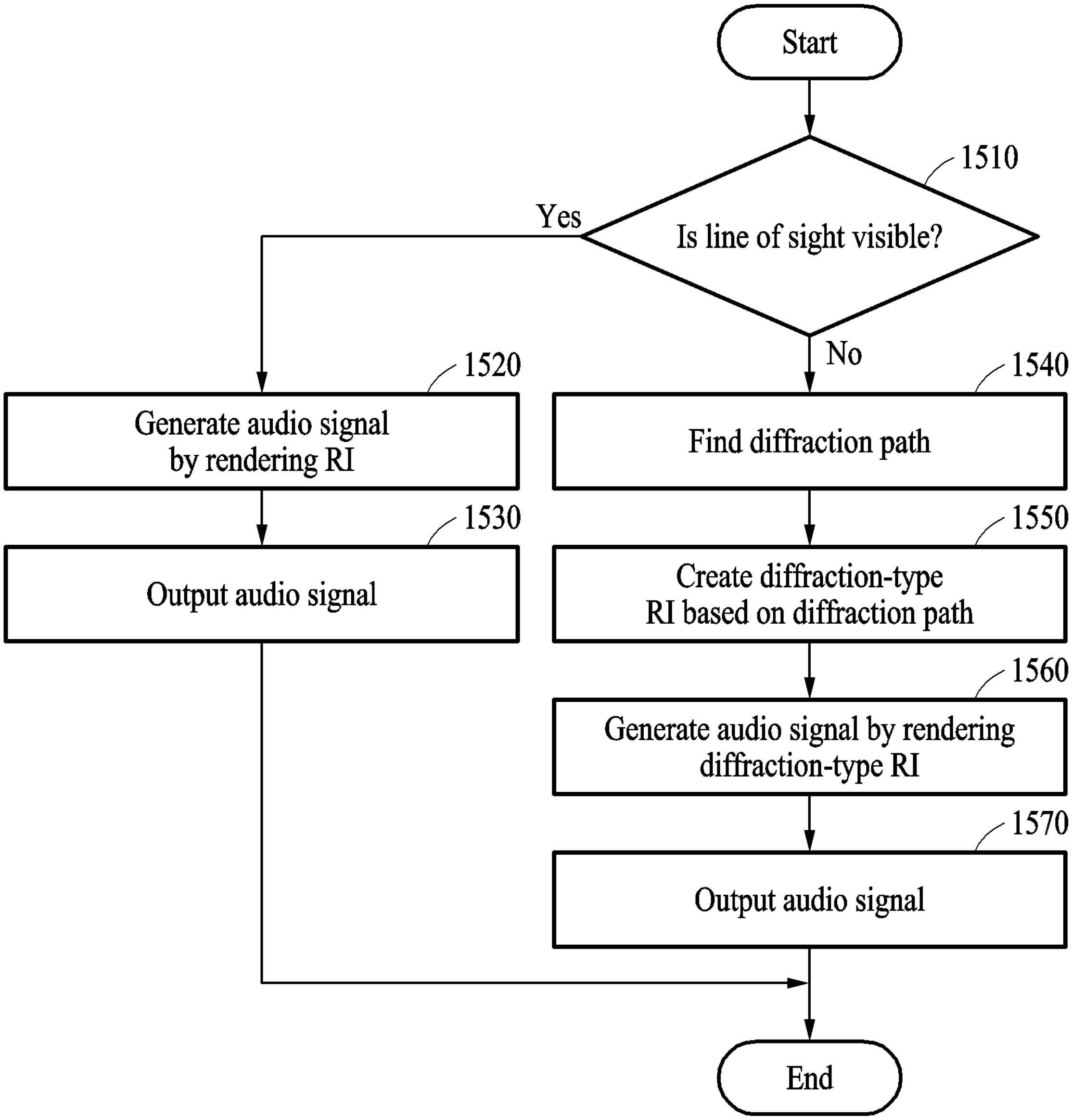
FIG. 15 is a flowchart illustrating an operation of an audio signal processing method according to an embodiment.

FIG. 15 is a flowchart illustrating an operation of an audio signal processing method according to an embodiment.

In operation 1510, the audio signal processing apparatus 1200 may determine whether a line of sight is visible. In operation 1520, when the line of sight is invisible in operation 1510, the audio signal processing apparatus 1200 may generate an audio signal by rendering a RI. In operation 1530, the audio signal processing apparatus 1200 may output the generated audio signal.

Descriptions of operations 1410, 1420, and 1430 of FIG. 14 may be respectively applied to the above-mentioned operations 1510, 1520, and 1530 in substantially the same manner.

In operation 1540, when the line of sight is invisible in operation 1510, the audio signal processing apparatus 1200 may perform a diffraction path finding process from the RI to the listener. The audio signal processing apparatus 1200 may examine validity of a diffraction path determined according to the diffraction path finding process.

In operation 1540, the audio signal processing apparatus 1200 may perform the diffraction path finding process using geometrical data. For example, a bitstream input to the audio signal processing apparatus 1200 may include the geometrical data.

In operation 1550, the audio signal processing apparatus 1200 may create a diffraction-type RI based on the diffraction path. The audio signal processing apparatus 1200 may create the diffraction-type RI for a valid diffraction path.

In operation 1560, the audio signal processing apparatus 1200 may generate an audio signal by rendering the diffraction-type RI. In operation 1570, the audio signal processing apparatus 1200 may output generated the audio signal.

The example embodiments described herein may be implemented using a hardware component, a software component and/or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the embodiments may be recorded in non-transitory computer-readable media including program instructions to implement various operations of the embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. An audio signal processing method performed by an audio signal processing apparatus, the method comprising:
   - determining whether a line of sight between a render item (RI) corresponding to an audio element and a listener is visible, based on a bitstream;
   - in response to a case where the line of sight is invisible, generating an audio signal by rendering a diffraction-type RI corresponding to the RI;

in response to a case where the line of sight is visible, generating an audio signal by rendering the RI without creating the diffraction-type RI; and outputting the audio signal.

2. The method of claim 1, wherein the generating comprises:

performing a diffraction path finding process from the RI to the listener to find a diffraction path and creating the diffraction-type RI based on the diffraction path.

3. The method of claim 2, wherein the diffraction path finding process is performed by using geometrical data from the bitstream.

4. The method of claim 3, wherein the geometrical data is included in metadata in the bitstream.

5. The method of claim 1, wherein the determining comprises:

determining whether the line of sight is visible by using line-of-sight occlusion information based on the bitstream.

6. The method of claim 1, wherein the determining comprises:

determining whether the line of sight is visible based on whether a direct sound of the RI is directly delivered to the listener.

7. The method of claim 1, wherein the determining comprises:

determining whether the line of sight is visible based on whether an occlusion exists in a shortest path between the RI and the listener.

8. The method of claim 1, wherein the determining comprises:

determining whether the line of sight is visible based on whether an impulse response between the RI and the listener includes a response of a shortest path between the RI and the listener.

9. An audio signal processing method performed by an audio signal processing apparatus, the method comprising:

determining whether a line of sight between a render item (RI) corresponding to an audio element and a listener is visible based on a bitstream;

in response to a case where the line of sight is invisible, performing a diffraction path finding process from the RI to the listener to find a diffraction path;

in response to a case where the line of sight is visible, generating an audio signal by rendering the RI without creating the diffraction-type RI; and creating a diffraction-type RI based on the diffraction path.

10. An audio signal processing apparatus comprising:

a processor; and a memory configured to store at least one instruction executable by the processor, wherein, when the at least one instruction is executed by the processor, the processor is configured to:

determine whether a line of sight between a render item (RI) corresponding to an audio element and a listener is visible based on a bitstream;

in response to a case where the line of sight is invisible, generate an audio signal by rendering a diffraction-type RI corresponding to the RI;

in response to a case where the line of sight is visible, generate an audio signal by rendering the RI without creating the diffraction-type RI; and output the audio signal.

11. The apparatus of claim 10, wherein the processor is configured to:

perform a diffraction path finding process from the RI to the listener to find a diffraction path and create the diffraction-type RI based on the diffraction path.

12. The apparatus of claim 11, wherein the diffraction path finding process is performed by using geometrical data from the bitstream.

13. The apparatus of claim 12, wherein the geometrical data is included in metadata in the bitstream.

14. The apparatus of claim 10, wherein the processor is configured to:

determine whether the line of sight is visible by using line-of-sight occlusion information based on the bitstream.

15. The apparatus of claim 10, wherein the processor is configured to:

determine whether the line of sight is visible based on whether a direct sound of the RI is directly delivered to the listener.

16. The apparatus of claim 10, wherein the processor is configured to:

determine whether the line of sight is visible based on whether an occlusion exists in a shortest path between the RI and the listener.

17. The apparatus of claim 10, wherein the processor is configured to: determine whether the line of sight is visible based on whether an impulse response between the RI and the listener includes a response of a shortest path between the RI and the listener.

* * * * *